Sept. 6, 1960    V. S. BOBKOWSKI    2,951,422
ARTICLE HANDLING SYSTEM FOR CARTRIDGE FEEDING
Filed May 11, 1956    6 Sheets-Sheet 1
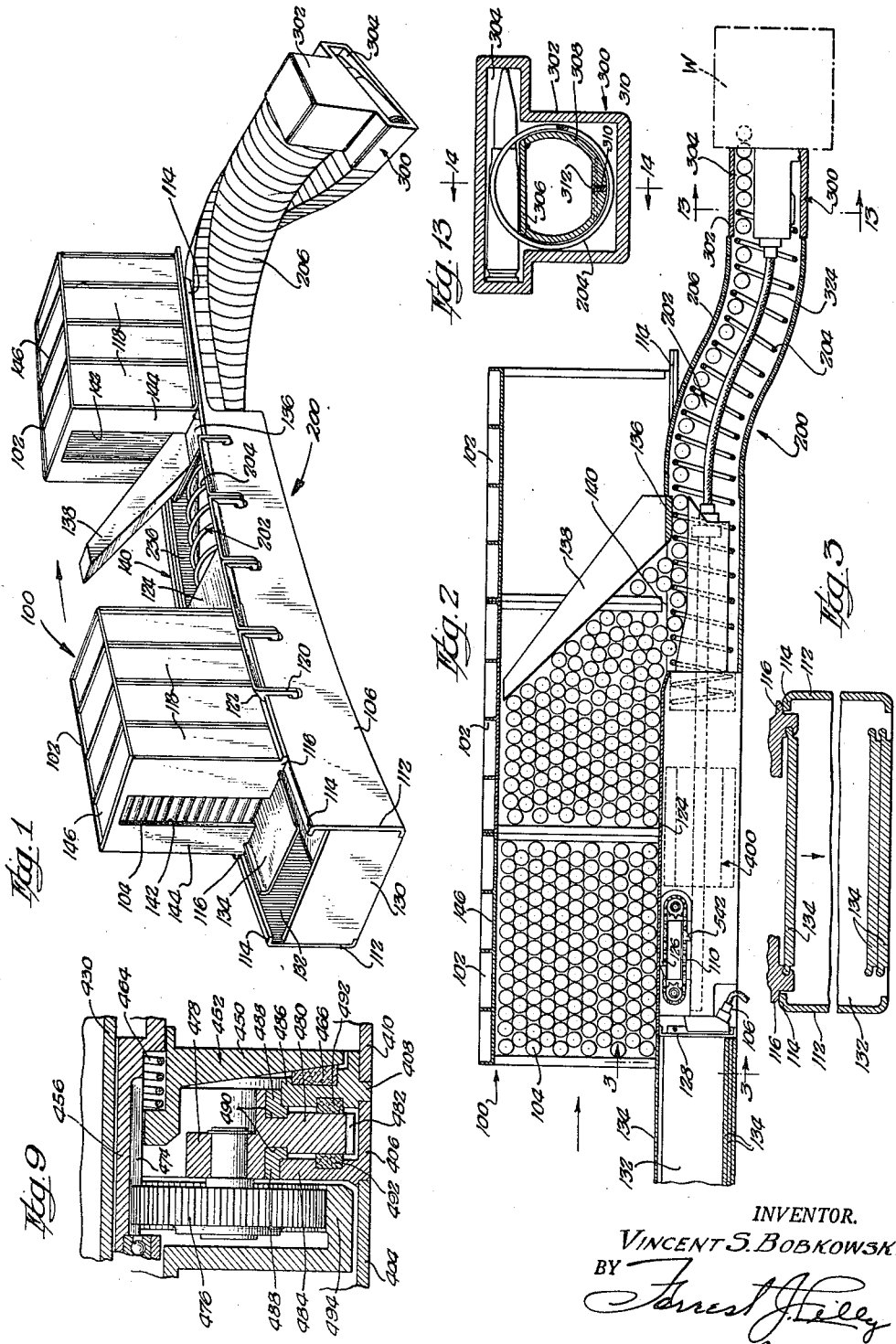
INVENTOR.
VINCENT S. BOBKOWSKI
BY
ATTORNEY.

Sept. 6, 1960 V. S. BOBKOWSKI 2,951,422
ARTICLE HANDLING SYSTEM FOR CARTRIDGE FEEDING
Filed May 11, 1956 6 Sheets-Sheet 2
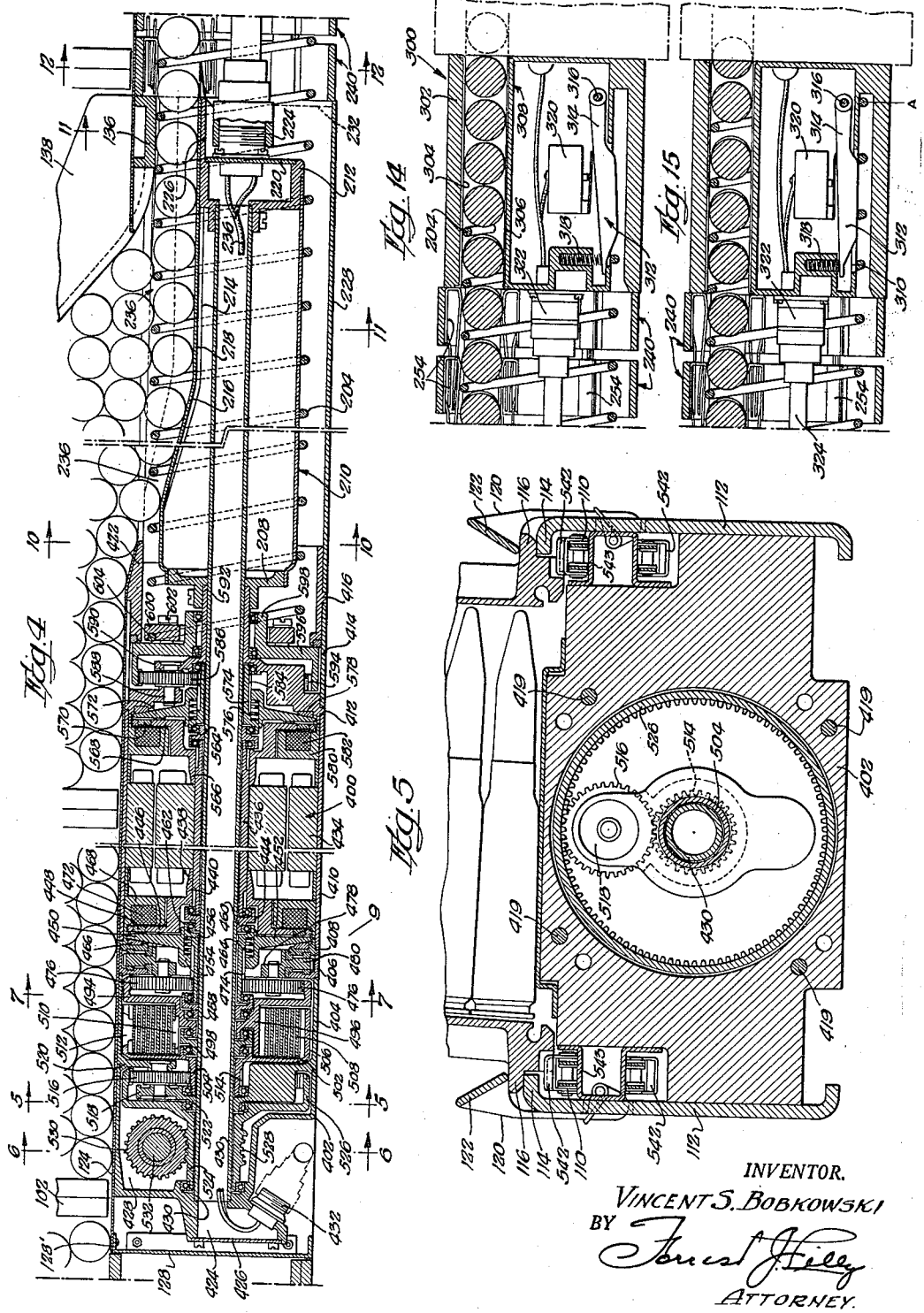
INVENTOR.
VINCENT S. BOBKOWSKI
BY
ATTORNEY.

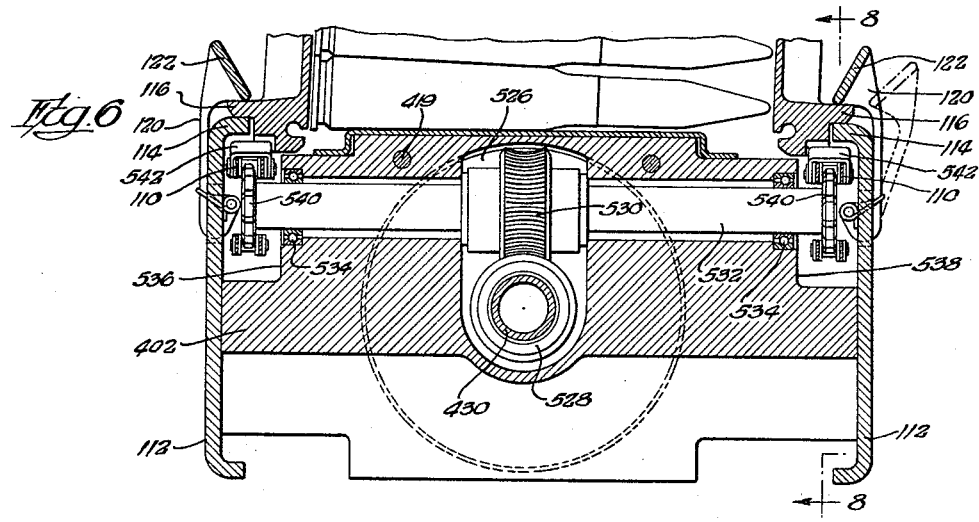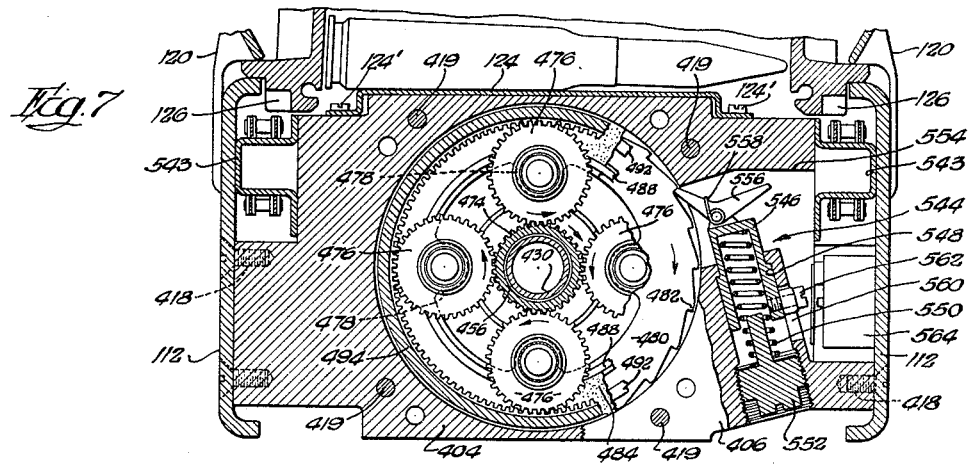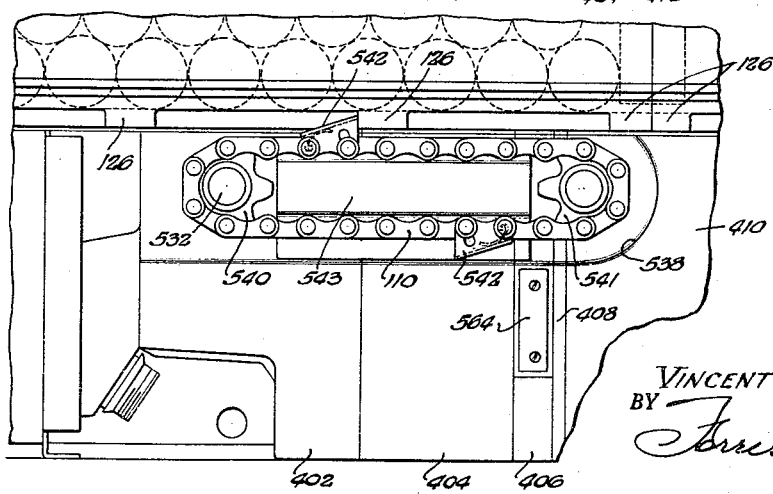

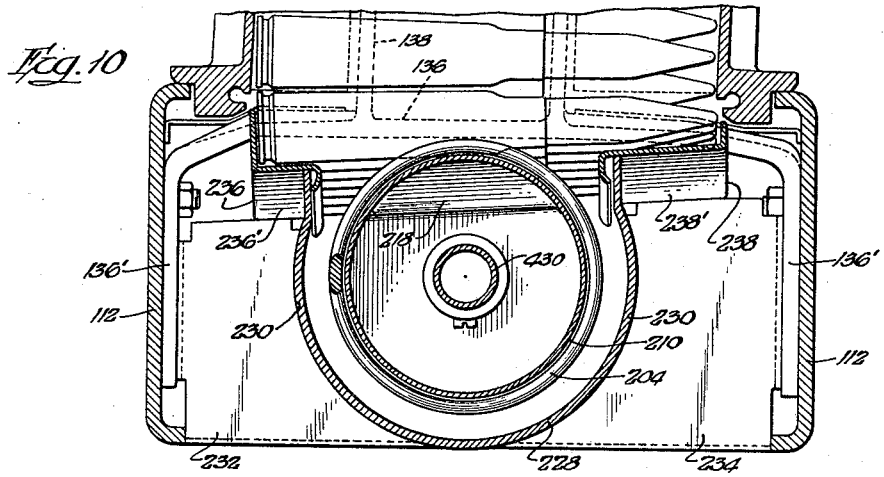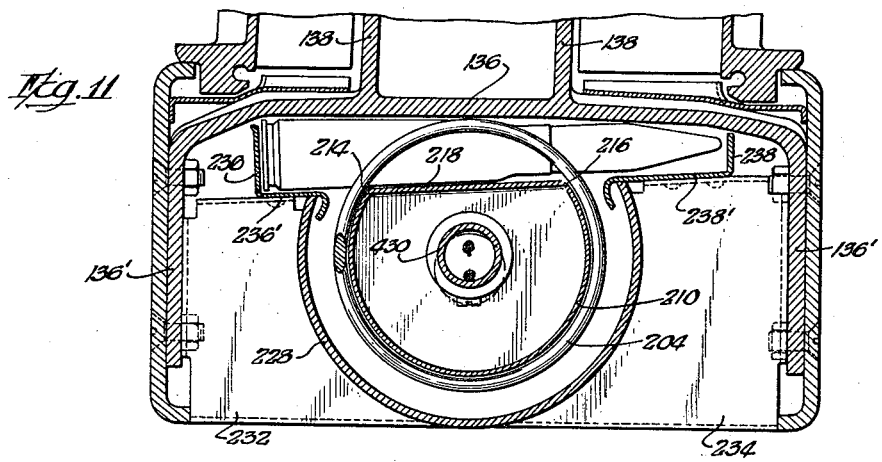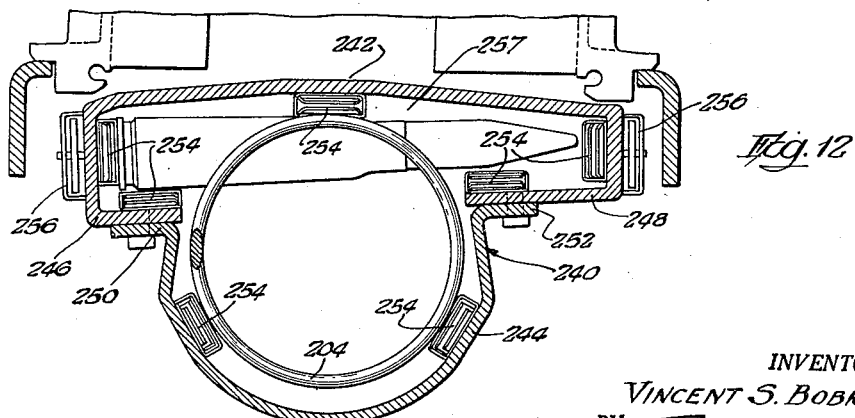

Sept. 6, 1960   V. S. BOBKOWSKI   2,951,422
ARTICLE HANDLING SYSTEM FOR CARTRIDGE FEEDING
Filed May 11, 1956   6 Sheets-Sheet 5
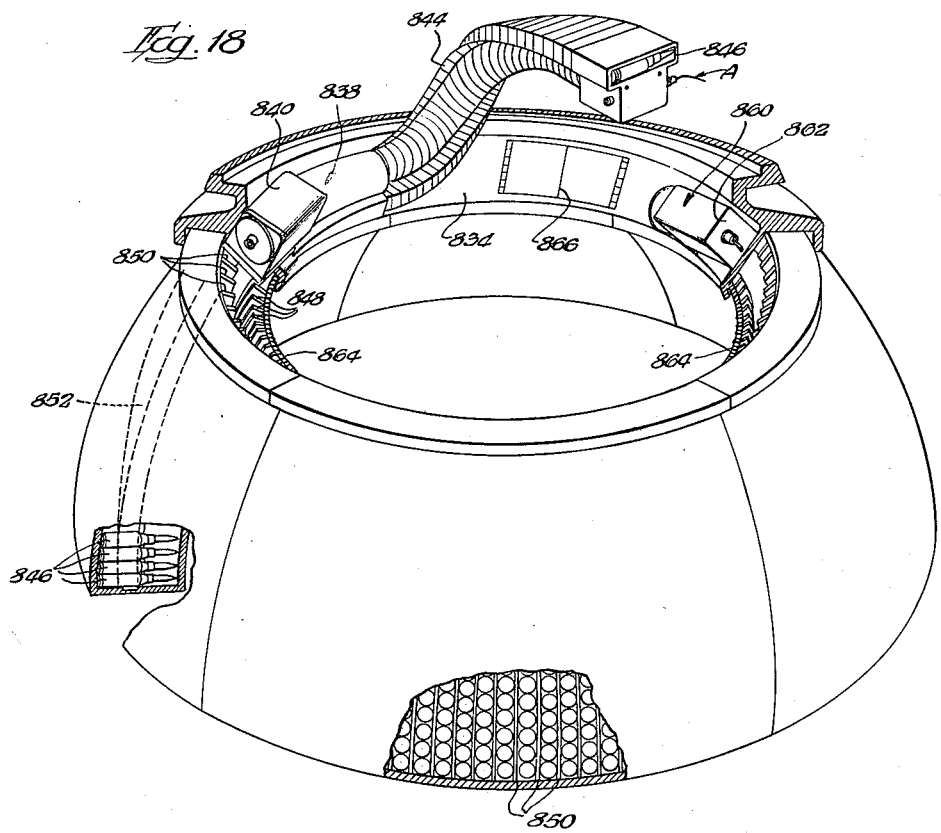
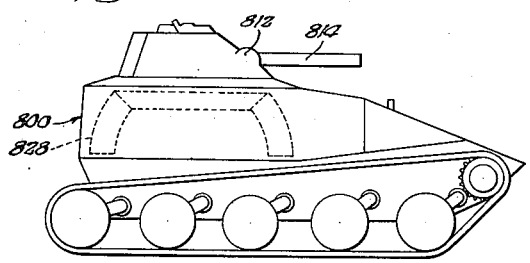
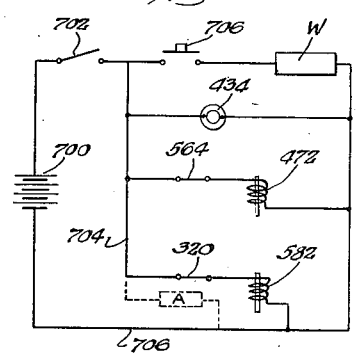
INVENTOR.
VINCENT S. BOBKOWSKI
BY
ATTORNEY.

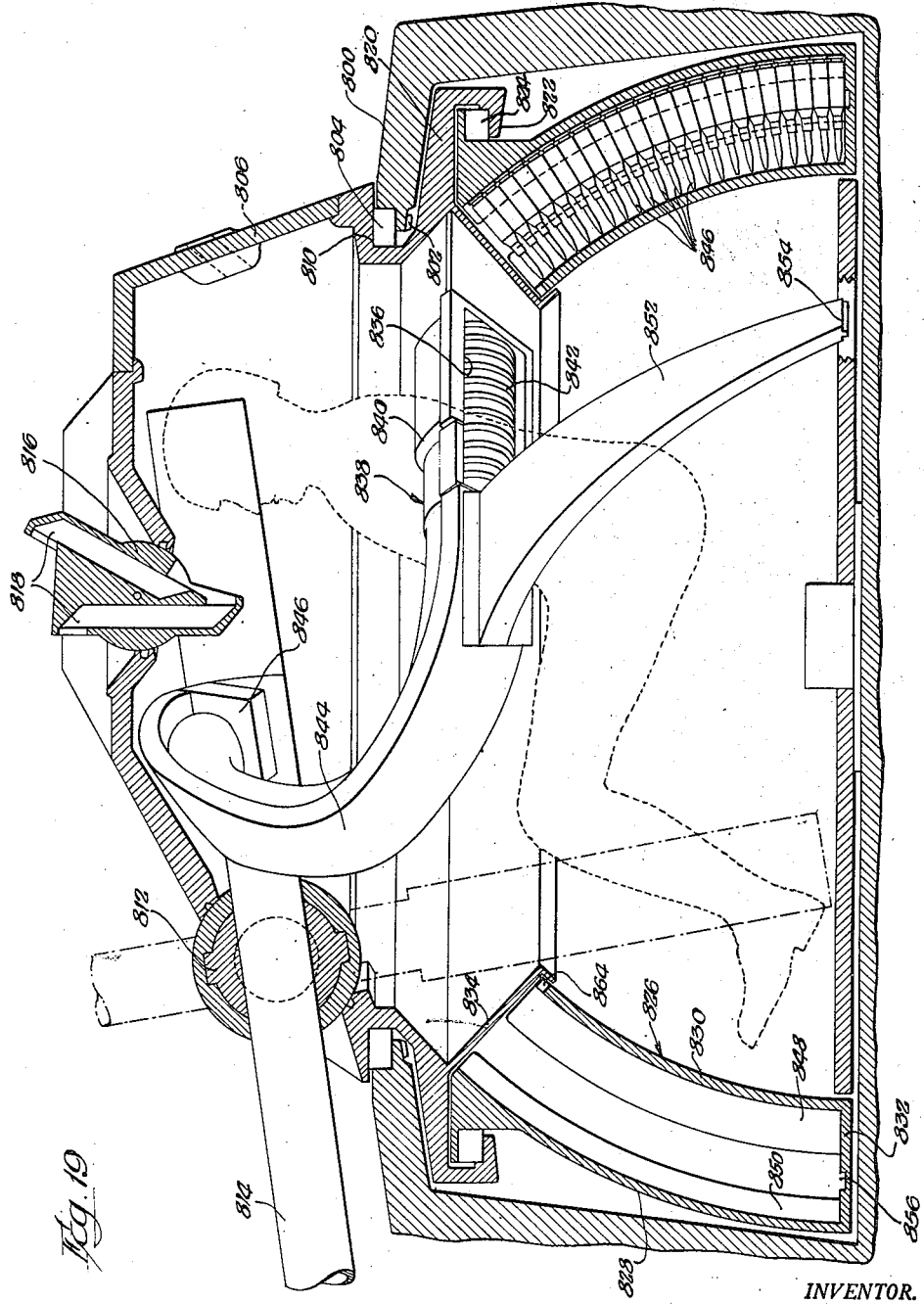

United States Patent Office 2,951,422
Patented Sept. 6, 1960

2,951,422
ARTICLE HANDLING SYSTEM FOR CARTRIDGE FEEDING

Vincent S. Bobkowski, Los Angeles, Calif., assignor to Armament Components, Inc., Santa Ana, Calif., a corporation of California Filed May 11, 1956, Ser. No. 584,289

21 Claims. (Cl. 89—33)

This invention relates to article handling systems and particularly to a new and improved system for bulk storage of articles and high speed individual dispensing of the latter from the storage facility to a point of use.

In many types of article handling systems it is desirable or essential that the system be capable of storing in bulk storage facilities a relatively large quantity of articles to be handled and individually dispensing the same on demand at an extremely high rate from the bulk storage facility to a point of use. One type of article handling system in which such features are essential are ammunition handling systems for use with automatic weapons. The present illustrative application of the invention is concerned with an improved ammunition handling system of this character, but it will become clear as the description proceeds that the concepts and instrumentalities disclosed herein may be adapted to numerous other uses.

According to modern concepts of warfare, maximum effectiveness in air-to-air and ground-to-air fire against high speed aircraft is obtained with automatic weapons capable of firing exceedingly large numbers of rounds in bursts of short time duration. In the case of automatic weapons designed for anti-personnel use, on the other hand, the ability to store relatively large quantities of ammunition, rather than the rate of fire, is a primary factor.

Existing automatic handling systems for ammunition, such as cartridges, missiles, rockets, etc., are generally designed for use with linked ammunition, that is, ammunition wherein the rounds are clipped to a series of pivotally connected links. During firing, an intermittent pull is applied to the belt of linked ammunition by gun recoil or other power actuated mechanisms for feeding the linked rounds through the weapon.

The primary deficiencies of existing automatic linked ammunition handling systems are relatively slow rates of fire, inefficient ammunition storage and excessive weight. Thus, because of the magnitude of the forces necessary to pull a belt of linked ammunition through a weapon and the limited belt-pull capacities of modern automatic weapons, only a relatively slow ammunition feed rate, and, therefore a relatively low rate of fire can be achieved with linked ammunition handling systems. Also, since the links space the adjacent rounds a specific pitch distance and the links themselves consume substantial space, only a very limited number of rounds can be stored in a container given volume as compared to unlinked ammunition. Moreover, the weight of the links further restricted the number of rounds that could be stored in a handling system of a given maximum allowance weight. The use of linked ammunition also poses the often difficult problem of disposing of the links after firing of the rounds.

A primary object of the present invention is the provision of a new and improved article handling system of the class described.

Another object is the provision of a new and improved system for storing and feeding unlinked articles of ammunition and the like.

Yet another object is the provision of a new and improved high speed handling system for articles of ammunition and the like which enables the storage of a maximum number of articles in a given storage space.

Still another object is the provision of a new and improved high speed conveyer system for individually dispensing articles of ammunition and the like from a bulk supply of said articles to a point of use.

A further object is the provision of an improved handling system for articles of ammunition and the like which may be rapidly and easily loaded with a relatively large number of articles with a minimum of manual operations.

A like object is the provision of an improved handling system for articles of ammunition wherein the loose rounds of ammunition have been pre-packaged in suitably designed hoppers, permitting the progressive placement of said loaded hoppers rapidly and easily with a minimum of manual effort in juxtaposition to the handling system to maintain a continuing supply of ammunition to be dispensed by the handling system.

A further object is the provision of a high speed linkless ammunition handling system.

Yet a further object is the provision of a new and improved system for storing unlinked rounds of ammunition in bulk and individually dispensing the rounds in rapid succession from the storage facility to an automatic weapon.

And yet a further object of the invention is the provision of a new and improved high speed linkless ammunition handling system which is uniquely adapted to linear installations wherein the rounds are contained in individual, replaceable hoppers and to turret installations wherein the natural taper of ammunition rounds is taken advantage of to accommodate bulk storage of a maximum number of rounds in minimum storage space.

The above and other objects are achieved in the illustrative embodiments of the invention by the provision of a helical feed conveyer means having at one end an entrance opening and terminating at its other end a weapon reservoir and feed unit. Operatively associated with this conveyer means is an ammunition storage and actuating means embodying either a plurality of individual, refillable ammunition hoppers or, a continuous, generally hemispherical ammunition supply ring, and an actuating mechanism for advancing the storage hoppers or rings, as the case may be, past the entrance opening of the conveyer system. A fixed, projecting, ammunition camming guide, adjacent the opening and against which the rounds are pressed by advancing of the hoppers or ammunition ring, serves to guide the rounds from the hoppers or supply ring through the conveyer entrance opening, to positions between the turns of the conveyer helix. During operation of the handling system, continuous, predetermined forced contact of the rounds with the guide is maintained and the conveyer helix is rotated to convey the rounds entering the conveyer opening to the weapon reservoir which will be mounted on a weapon. When the weapon is not being fired, the ammunition storage and actuating means and the conveyer means continue to operate until the weapon reservoir has been filled with a predetermined number of rounds whereupon operation of the ammunition storage and actuating means and conveyer means is terminated. Upon subsequent firing of the weapon, the storage and actuating means and the conveyer means are rendered operative to provide a continuous, high speed flow of rounds from the storage container to the weapon.

In linear feed installations utilizing individual ammunition hoppers, the latter are provided with removable bottom lids which, in storage of the hoppers, form bottom closures for the latter. These removable lids of the hoppers are automatically removed from the latter during operation of the system to advance the hoppers past the conveyer inlet opening so that loading of the system is accomplished rapidly and with a minimum of manual operations.

In turret installations, the rounds are loaded into a generally hemispherical ammunition ring which is so constructed as to take advantage of the natural contour of the rounds and thereby obtain maximum ammunition storage with a minimum envelope.

With the foregoing preliminary discussion in mind, reference is now made to the following detailed description of certain physical embodiments of the invention wherein reference is had to the attached drawings, in which:

Fig. 1 is a perspective view of one form of an ammunition handling system embodying the features of the invention;

Fig. 2 is an enlarged section taken longitudinally through the ammunition handling system of Fig. 1;

Fig. 3 is a section taken along line 3—3 of Fig. 2;

Fig. 4 is an enlarged section illustrating certain mechanisms embodied in the ammunition handling system of Figs. 1 and 2;

Fig. 5 is an enlarged section taken along line 5—5 of Fig. 4;

Fig. 6 is an enlarged section taken along line 6—6 of Fig. 4;

Fig. 7 is an enlarged section taken along line 7—7 of Fig. 4;

Fig. 8 is a view looking in the direction of the arrows 8—8 in Fig. 6;

Fig. 9 is an enlarged view of the area indicated by the arrow 9 in Fig. 4;

Figs. 10, 11, and 12 are enlarged sections taken along lines 10—10, 11—11, and 12—12 of Fig. 4;

Fig. 13 is a section taken along lines 13—13 of Fig. 2;

Fig. 14 is an enlarged section taken along line 14—14 of Fig. 13 illustrating certain parts of the present system in one condition of operation;

Fig. 15 is a view similar to Fig. 14 illustrating said parts in another condition of operation;

Fig. 16 is a schematic showing of a control circuit embodied in the present ammunition handling system; and Figs. 17–19 illustrate a turret application of the present ammunition handling system.

One form of a linkless ammunition handling system, constituting the illustrative application of the invention, is illustrated in Figs. 1–15 wherein the aforementioned ammunition storage and actuating means is generally designated by the numeral 100, the conveyer means by the numeral 200, and the weapon reservoir and feed unit by the numeral 300.

Referring first to Figs. 1 and 2, illustrating the linear ammunition handling system in its entirety, the ammunition storage and actuating means 100 comprises a series of bulk storage containers in the form of separate hoppers 102 containing rounds 104 of unlinked ammunition and an elongated hopper support 106 slidably supporting the hoppers 102 and enclosing chain feed drive means 110, driven by mechanism 400, for advancing the hoppers 102 in the direction indicated. As will be shortly seen, the hopper support 106 comprises the frame of the ammunition conveyer 200.

The support 106 comprises side walls 112 whose upper edges are inwardly flanged at 114 to form rails on which are slidably supported outwardly extending flanges 116 along the lower edges of the hopper side walls 118. Spring loaded self-latching guides 120, hinged to the actuator housing side walls 112, as shown most clearly in Figs. 5 and 6, have portions 122 extending inwardly over the hopper flanges 116 to receive the hoppers 102 during loading from above and retain the hoppers on the rails 114. Indicated at 124 is an upper ammunition support panel on the support or frame 106 between and having its sides spaced from the frame side walls 112 to accommodate spaced lugs 126 along the lower edges of the hopper side walls. As will presently be described, this panel serves to close the open lower sides of the hoppers 102 as they are advanced along the support or frame 106. These lugs are engageable with drive shoulders on the chain drives 110, as will presently be more fully explained, to provide for advancing of the hoppers.

The ammunition support panel 124 has one edge terminating at a vertical wall 128 (Fig. 2) which is spaced from an end wall 130 of the hopper support to define at the loading, or left hand end, as viewed in the drawings, of the support a lid bin 132. Hoppers 102 have open bottoms closed by sliding covers or lids 134 which are retained stationary, by engagement thereof with the forward bin wall 128, when the hoppers are advanced along the hopper support in the direction indicated from a loading position, overlying the bin, the lids being thereby slidably separated from the hoppers and dropping into the bin 132.

The forward, or right hand end, of the ammunition support plate 124 terminates in spaced relation to a forward, transverse guide support 136 rigidly mounting an upstanding rearwardly inclined ammunition camming guide 138 over which the hoppers 102 are advanced during movement thereof along the support 106 to its right hand unloading end. The space between the ammunition support panel 124 and the guide support 136 defines an entrance opening 140 of the conveyor means 200, the latter including, as will shortly be more fully explained, helical feed mechanism 202 having one end underlying the entrance opening 140.

Advancing of the hoppers 102 over the guide 138 is accommodated by slots 142 in the end walls 144 of the hoppers, which open through the lower edges of the end walls and extend upwardly to the hopper top walls 146. The ammunition rounds 104 are loaded in the hoppers with their axes paralleling the hopper end walls 144 and have a length slightly less than the width of the hoppers, the arrangement being such that as each hopper is advanced over the guide 138, the rounds 104 will be cammed downwardly along the inclined rear face of the guide, through the conveyer entrance opening 140 to positions of engagement between adjacent turns of the helical feed mechanism 202, as may be seen from Fig. 2 and as will be presently more fully described.

As may be seen most clearly from Fig. 2, the helical feed mechanism 202 comprises a spiral feed spring 204 adjacent turns of which are normally spaced a distance somewhat greater than the diameter of the rounds 104 so that each round entering the entrance opening 140 may freely drop between an adjacent pair of such turns. A portion of the spring is rotatably enclosed in flexible feed chuting 206 attached at one end to support 106 and at the other end to the weapon reservoir and feed unit 300.

The conveyor spring 204 is driven in rotation by the rotary drive mechanism 400 which, as previously mentioned, also actuates the hopper feed chains 110, all in a manner to be subsequently more fully described. Suffice it to say for the present that rotation of the spiral conveyer spring 204 will cause feeding of the rounds 104 away from the conveyer entrance opening 140 and through the flexible feed chuting 206 to the receiver or weapon reservoir and feed unit 300 adapted for attachment to the weapon W. The receiver or reservoir and feed unit 300 comprises a housing 302 defining a generally rectangular chamber 304 opening at one end to the interior of the feed chuting 206 for entrance of the rounds into the reservoir and open at its other end for exit of the rounds from the reservoir to the weapon.

Briefly, operation of the present ammunition handling system is as follows. A series of hoppers 102, filled with rounds 104, are loaded on the support 106 and are advanced along the latter by operation of the rotary drive mechanism 400, through the chain feed drive means 110, to bring the rounds in the first hopper into engagement with the guide 138. Rotary drive mechanism 400 includes an overload means, to be described, to maintain a predetermined pressure of the rounds 104 against the guide 138.

Spiral conveyor spring 204 is rotated, by rotary drive mechanism 400, simultaneously with the advancing of the ammunition hoppers so as to convey the rounds away from the entrance opening 140 to the receiver or weapon reservoir 300. Subsequently described control means associated with reservoir 300 is operative to discontinue rotation of the conveyor spring by the drive mechanism in response to the reservoir chamber 304 being filled to capacity and to continue rotation of the conveyor spring as the rounds exit therefrom to the weapon W.

Advancing of a hopper past the guide 138 will effect complete removal of all rounds from the hopper, the guide emerging from the latter through the rear slot 142 therein, whereupon the hopper is moved to the unloading position at the forward, or right hand end of the housing 106 for removal and eventual reloading. As illustrated in Fig. 2, the hoppers 102 are advanced in continuous fashion along the hopper support to provide for extremely high speed dispensing of large quantities of rounds to the weapon W.

With the above, rather general description of the present linear feed system in mind, reference is now had to Figs. 4-16 illustrating in greater detail the above described assemblies.

Referring first to Figs. 4-9, the drive 400 is shown as comprising an elongated drive housing composed of a series of hollow sections 402, 406, 408, 410, 412, 414, and 416. These sections are hollow, generally shell-like structures which are formed with interfitting shoulders and arranged in end-to-end relationship, as shown in Fig. 4, between the hopper support side walls 112 and are secured to the latter as by bolts 418, shown in Fig. 7, while the several sections are secured together by a series of through bolts 419 so as to form the several sections and side walls 112 into a rigid, unitary structure.

The forward wall 128 of the lid bin 132 is flanged along its opposite side edges for attachment, as by bolts to the side walls 112 and is flanged along its upper and lower edges, as shown. The upper flange 128' of this wall has its upper surface substantially coplanar with upper, flat surfaces on several sections 402 through 416, and the ammunition support plate 124 is secured to the upper surface of flange 128' and extends in flat faced engagement over the several sections, terminating at the forward end of the forward section 416. This forward end of the section 416 is downwardly inclined, as shown at 422 (Fig. 4), and the ammunition support panel or plate 124 is bent to conform to this inclination and is crimped over the forward edge of the section 416. The plate 124 may be secured to the several sections in any suitable manner as by screws 124', Fig. 7, the rounds 104 contained in the hoppers 102 sliding over the support plate after removal of the lids from the hoppers in the manner previously described.

The left hand section 402 has an enlarged open cavity 424 closed by a removable access plate 426 and communicating to a right hand hollow 428 of the section through a central bore having a counterbore for fixedly receiving one end of a hollow, central supporting sleeve 430 which extends through the several sections and is rigidly supported intermediate its ends in central sleeves on sections 404 and 412, as will be more fully described. The left hand end of the section 402 has its lower portion recessed for accommodating an electrical connector 432 which is fixed in a lower inclined wall of the cavity 424, as shown, and from which leads extend to manual control switches shown in Fig. 16.

Fixedly mounted within the intermediate section 410 is an electric motor 434 having a hollow drive shaft 436 loosely receiving the central supporting sleeve 430 therethrough. The left hand end of this shaft, as viewed in the drawings, is drivingly connected to the chain drives 110 for the hoppers 102 through drive mechanism now to be described, and the right hand end of the drive shaft 436 is drivingly connected to the spiral conveyor spring 204, through drive mechanism to be subsequently discussed.

The driving mechanism between the left hand end of shaft 436 and the chain drives comprises a friction clutch plate 438 having a central hub 440 keyed on the shaft 436 for rotation therewith. The axially intermediate portion of the clutch plate 438 is somewhat radially enlarged, compared to the hub 440, and formed with an enlarged cylindrical recess 444 into which the left hand end of the drive shaft 436 projects. The left hand end of the clutch plate 438 is further radially enlarged to provide a relatively thin clutch disk 446 adjacent the periphery of which, is an integral, annular friction insert 448 projecting slightly beyond the left hand face of the disk 446 for frictional engagement with the right hand face of a clutch disk 450 formed on a second clutch plate 452. This second clutch plate 452 includes a hub 454 which is slidably keyed on a sleeve 456 loosely received on sleeve 430.

Indicated at 458 and 460 are a pair of generally cylindrical bearing supports which are rigid on the central sleeve 430 and on which the opposite ends of sleeve 456 are rotatably supported by ball bearing assemblies, as shown. The left hand end of the drive shaft 436 is rotatably supported on the bearing support 460, as shown.

The hub 454 of the second clutch plate 452 has an enlarged central recess opening through the right hand end of the hub for slidable engagement over an enlarged shoulder 462 on the right hand end of the sleeve 456 and a coil compression spring 464 within this recess, abutting at opposite ends the clutch plate 452 and the shoulder 462 on sleeve 456, serves to bias the latter clutch plate to the left, as viewed in the drawings, to a position of frictional engagement of the left hand face of its clutch disk 450 with an annular friction insert 466 fixed in the section 408. The right hand face of said clutch disk 450 will then be disengaged from the friction insert 448 on the clutch plate 438. Since the section 408 is a stationary element, it will be seen that when the clutch disk 450 is urged against the friction insert 466, the clutch plate 452, and therefore, the sleeve 456, will be retained against rotation.

Indicated at 468 is an annular support which is rigidly fixed in the section 410 and is formed with an annular groove opening through the left hand face thereof, in which is wound an electromagnetic coil 472 adapted to be energized, in a manner to be hereinafter described. Clutch plate 438, support 468 and clutch plate 452 are formed of some magnetically permeable material so that upon energization of the coil 472, the clutch plate 452 will be attracted to the right against the action of its biasing spring 464 to bring the clutch disk 450 into frictional driving engagement with the magnetically nonpermeable annular friction insert 448 on the clutch plate 438 so that clutch plate 452 and sleeve 456 may be driven in rotation from the drive shaft 436.

Sleeve 456 is externally formed with teeth 474 meshing with four circumferentially spaced pinions 476 journaled in radially, inwardly extending projections 478 (Fig. 7) on a generally ring-shaped ratchet wheel 480 formed on its outer peripheral surface with ratchet teeth 482, as shown most clearly in Fig. 7. Ratchet wheel 480 is rotatably supported between annular radial flanges 484 and 486 (see Fig. 9) on sections 406 and 408 by a pair of ring bearings 488 engaging in annular grooves 490 in opposite faces of the ratchet wheel. The radial flanges 484 and 486 have annular bearing inserts 492 fixed therein and slidably engaging opposite side faces of the ratchet wheel 486 for increased supporting of the latter.

The gearing arrangement just described, comprises a planetary gear system wherein the gear 474 is the sun gear and the pinions 476 form planetary gears. This planetary gear system is completed by a ring gear 494 meshing with the planet gears 476 and having a central hub 496 journaled on bearing support 458 and another bearing support 498 by the ball bearing assemblies illustrated.

Indicated at 502 is a rotatable generally cup-shaped housing having a central hub 504 loosely received on the central supporting sleeve 430 and journaled on the bearing support 498 and on section 404 by ball bearing assemblies, as shown. Housing 502 has a peripheral, axially extending flange 506 which projects over, in radially spaced relationship to, the central hub 496 on the ring gear 494. Disposed in the radial space between the hub 496 and the flange 506 is a coil leaf spring 508 having its inner end secured to said hub, as by a key 510 fitting in a slot in the hub and having its outer end fixed to the flange 506 as by a key 512 fitting in a slot in said flange.

Hub 504 of the rotary housing 502 is formed externally with gear teeth 514 which mesh with a pinion 516 journaled between a pair of spaced radial extensions 518 and 520 on the section 404. Extension 518 extends from a central hub 522 of the section 404 which hub is rigidly supported on the central supporting sleeve 430.

Journaled at opposite ends on the hub 522 and on the left hand wall of the section 402, as by the ball bearing assemblies illustrated, is the hub 524 of a ring gear 526 which meshes with the pinion 516. Hub 524 is formed with an external helical worm 528 which meshes with a worm wheel 530 rigid on a shaft 532. As shown most clearly in Fig. 6, the shaft 532 extends through and is journaled at its opposite ends in the section 402, as by bearings 534. As shown in this latter figure, the upper side portions of the section 402 as well as sections 404—410, as shown in Fig. 8, are laterally relieved at 536 and 538 so as to be spaced from the side walls 112 of the hopper support housing.

Fixed to opposite ends of the shaft 532 within the clearance spaces 536 and 538 are sprocket wheels 540 around which end a pair of idler sprockets 541 (Fig. 8) journaled on the external side walls of the section 410 within the clearance spaces 536 and 538, are trained a pair of sprocket chains forming the previously mentioned chain feeds 110. Drive chains 110 each mount a pair of spaced spring loaded, hinged teeth or drive shoulders 542 which are engageable with the lugs 126 on the hoppers 102 so as to accomplish advancing of the hoppers by the drive chains 110. A pair of channel-shaped chain supports 543 are mounted on the side walls of the sections 402—406 and project outwardly between the horizontal runs of the chains, as shown, to prevent downward deflection of the upper ones of said runs and disengagement of the teeth 542 from the hopper lugs 126.

From the above description of the rotary drive 400, it will be seen that the coil spring 508 forms a driving connection or elastic coupling between the ring gear 494 and rotary housing 502 so that the drive chains 110 are driven from the motor 434 through this spring. Thus, driving of the motor 434 with the ratchet wheel 480 retained against rotation will cause winding up of the coil spring 508 until the tension therein overcomes the load on the chain drives whereupon the latter will be driven from the motor. It will also be apparent that any increase or decrease in the loading on the chain drives 110 will be reflected in a corresponding change in the tension in the coil spring and winding or unwinding thereof.

The ratchet wheel or planet pinion support member 480 has applied thereto, through the axles of the planet pinions 476, a reaction force which is equal and opposite to the driving force between the planet pinions 476 and the ring gear 494 and which tends to rotate the ratchet wheel in a direction opposite to the direction of rotation of the ring gear. If the ratchet wheel is releasably restrained against such rotation with a force having a preset maximum value, so that the ratchet wheel will be released for rotation if said reaction force exceeds said preset value, it will be seen that so long as the chain drive loading is such as to yield a reaction force on the ratchet wheel 480 which is less than said preset value, the ratchet wheel will remain stationary and the ring gear 494 will be driven by the planet pinions 476 to advance the drive chains. However, any increase in the load on the drive chains resulting in a reaction force on the ratchet wheel which is greater than said preset value, will cause rotation of the ratchet wheel in said opposite direction and planetary movement of the planet gears 476 about the sun gear 474, the ring gear 494 remaining stationary. This rotation of the ratchet wheel is utilized to discontinue driving of the chain drives as described below.

Indicated at 544 in Fig. 7 is a spring biased pawl assembly or force sensing means for releasably restraining the ratchet wheel against rotation. This assembly comprises a shouldered plunger 546 which is slidable in a bore 548 in the section 406 in the plane of the ratchet wheel 480. A coil compression spring 550 abutting at opposite ends the plunger 546 and a plug 552 threaded in the lower end of bore 548 serves to bias the plunger upwardly in the bore to a position wherein the upper, externally reduced portion thereof projects through a reduced upper end of the bore 548 into a clearance space 544 formed in the section 406, such upward movement of the plunger being limited by engagement of its shoulder with the shoulder at the upper end of bore 548. Pivotally mounted on the upper end of the plunger is a pawl 556 which is biased by a spring 558 into engagement with the ratchet wheel 480.

The wall of bore 548 is formed with a longitudinal slot 560 through which projects a stud 562 secured to the lower end of the plunger 546. In the upper position of the plunger, stud 562 is disengaged from a normally closed microswitch 564 while upon downward movement of the plunger the stud is brought into engagement with the microswitch 564 to open the latter and cause de-energization of the clutch coil 472 which is in electrical circuit with the microswitch, as will hereinafter be more fully explained.

From the description of the spring loaded pawl assembly 544 given above, it will be seen, assuming a clockwise rotation of sun gear 474 on sleeve 456, as viewed in Fig. 7, that so long as the reaction force exerted by the planet pinions 476 on the ratchet wheel 480 is less than the restraining force of the pawl assembly, the ratchet wheel 480 will be held against rotation, and switch 564 will remain closed so that advancing of the chain drives 110 will continue. Upon the reaction force on the ratchet wheel 480 exceeding the restraining force of the pawl assembly, due to increased loading on the chain drives 110, the ratchet wheel will rotate in a clockwise direction, as viewed in Fig. 7, to move the plunger 546 downwardly in the bore 548 against the action of spring 550 and thereby bring stud 562 into engagement with microswitch 564 to open the latter and de-energize the clutch coil 472. De-energization of the coil 472 releases the clutch plate 452 for left hand movement, as seen in Fig. 4, under the action of its biasing spring 464, to a position of frictional engagement of its clutch disk 450 with the friction insert 466 which serve to brake the clutch plate 452 against rotation when disengaged from the clutch plate 438 and thereby prevent unwinding of the spring 508 as will presently be more fully explained. Subsequent decrease in the chain loading and unwinding of the coil spring 508 permits extension of the plunger 546 and reclosing of switch 564 to continue driving of the chain drives, as will hereinafter be more fully described.

During operation of the system, to be subsequently described in greater detail, the hoppers 102 are advanced along the hopper support, by driving of the drive chains 110, to a position whereat the first hopper overlies the entrance opening 140 of the conveyor system 200 and the rounds in the first hopper are engaged by the guide 138 for camming of the rounds through said opening. The drive mechanism 400, just described, is operative to maintain constant pressure, within predetermined minimum and maximum limits, of the rounds against the guide so as to assure continued camming of the rounds through the entrance opening 140 into the conveyor system. The inclination of the ammunition support plate 124, at the rear edge of the entrance opening 140, provides for gradual entrance of the rounds into said opening, as may be seen from Fig. 4.

Motor 434 which operates to drive the drive chains 110 also serves to rotate the coil conveyor spring 204, as will now be described. To this end, the drive shaft 436 of motor 434 extends beyond the righthand end of the motor and is journaled at its free end on a bearing support 564, fixed on the central supporting sleeve 430, as by the ball bearing assemblies shown. Keyed on this extending end portion of the drive shaft is a clutch plate 566 having a clutch disk 568 with a friction insert 570.

Indicated at 572 is a second clutch plate which is slidably keyed on a sleeve 574 for movement toward and away from clutch plate 568, clutch plate 572 being normally biased away from clutch plate 568 by means of a coil compression spring 576 into frictional engagement with friction insert 578, on the section 412. Sleeve 574 is journaled at one end on the bearing support 564 and at the other end on the section 412 by bearing assemblies shown so that the clutch plate 572 and sleeve 574 are mounted for rotation about the central supporting sleeve 430.

An annular coil housing 580, similar to coil housing 468, is annularly grooved inwardly from its right hand face for receiving an electromagnetic coil 582 which is energized in a manner to be presently described. Clutch plate 568, housing 580 and clutch plate 572 are made of magnetically permeable material so that upon energization of the coil 582, the latter clutch plate 572 will be attracted toward the clutch plate 568 and into frictional driving engagement with the magnetically non-permeable annular insert 570 against the action of the biasing spring 576.

Sleeve 574 is formed externally with gear teeth 584 meshing with a pinion 586 journaled between a pair of radial extensions 588 and 590 on the section 412 in the same manner as pinion 516, previously described. Radial extension 590 extends radially outwardly from a central hub 592, which is firmly supported on the central supporting sleeve 430.

Pinion 586 meshes with an internal ring gear 594 having a radial web portion 596 and a central hub 598 journaled, as by the bearing assemblies shown, on the central hub 592 of the section 412. Fixed on the righthand face of the radial web 596 of the ring gear 594 is a holding ring 600, which is secured to said web portion as by bolts 602. This holding ring is slotted at 604 for receiving one end of the spiral conveyor spring 204.

From the description of the latter portion of the drive 400, it will be seen that with clutch coil 582 energized to retain clutch plate 572 in frictional driving engagement with clutch plate 568, driving of motor 434 to rotate its central drive shaft 436, will cause rotation of the spiral conveyor spring 204 through the gearing arrangement comprising gear 584, pinion 586, and ring gear 594. Upon de-energization of the clutch coil 582, clutch plate 572 will be biased, by a coil compression spring 576, into frictional engagement with the friction insert 578 which act as a brake for restraining the clutch plate 572, and therefore the coil conveyor spring 204 against rotation, for reasons to be presently appreciated.

The conveyor system 200 will now be more completely described. Indicated at 208, is a disk having central hub fixed on the free end of the aforementioned hub 592 of section 412. Secured to the periphery of this disk and extending forwardly therefrom is a hollow shell 210 which is secured at its other end to a casting 212. The left hand end of a shell 210, as viewed in Fig. 4, is cylindrical, as shown in Fig. 10, and has diameter slightly less than the internal diameter of helical conveyor spring 204. At a point spaced somewhat forwardly from the lefthand end of the shell 210, the upper portion of the latter is cut away to form thereon a pair of upper edges 214 and 216 (Fig. 11) which, as shown in Fig. 4 incline downwardly from the lefthand end of the shell 210 and then extend in parallel relationship to the axis of the shell 210.

Secured, as by welds, to these upper edges 214 and 216 of the shell 210 and inclined in conformance with the inclination of the edges 214 and 216 is a bearing plate 218 along which the rounds 104 slide as they are conveyed away from the conveyor entrance opening 140 during operation of the helical conveyor spring 204, to be hereinafter more fully described.

Casting 212, secured to the forward or righthand end of shell 210, is a hollow, generally semi-cylindrical member having a forward removable closure plate 220 mounting an electrical receptacle 224 from which leads 226 extend to the receptacle 432, previously referred to, through the hollow, central supporting sleeve 430 the righthand end of which is secured in a hub on the casting, as shown. The casting has a flat, forwardly extended, upper surface 226 to which the forward end of the bearing plate 218 is affixed.

The length of helical conveyor spring 204 between the forward section 416 of the drive assembly 400 and the transverse support plate 136 which mounts the upstanding ammunition camming guide 138 is enclosed in a generally, semicylindrical shell 228 and lefthand end of which is secured to the section 416 and the righthand end of which terminates in the plane of the forward or righthand edge of the support 136.

As shown most clearly in Figs. 10 and 11, the support 136 is formed with downward extensions 136' which are bolted to the inner surfaces of the hopper support side walls 112. The forward end of the outer semicylindrical shell 228 is welded to the inner arcuate edges 230 of a pair of transverse walls 232 and 234 having outer vertical flanged edges secured to the extensions 136' of the support 136 so as to provide for rigid supporting of the forward end of shell 228 on the hopper support.

Secured at their forward ends to upper flanges on the walls 232 and 234 and extending rearwardly therefrom are a pair of elongated angles 236 and 238 having parallel vertical flanges and lateral, coplanar flanges 236' and 238', respectively, extending inwardly from the bases of their respective vertical flanges. The lefthand ends of these angles are secured to the section 416.

As illustrated in Figs. 10 and 11 the angles 236 and 238 form guides for the nose and breech ends of the rounds 104 to prevent tilting of the latter as they are advanced by rotation of the helical conveyor spring 204. To this end, the vertical flanges of the angles are spaced a distance slightly greater than the length of the rounds, and the lateral flanges 236' and 238' of the angles are coplanar with and are longitudinally inclined in conformance with the aforementioned longitudinal inclination of the bearing plate 218, on shell 210. Also the common plane of the lateral flanges 236' and 238' and the bearing plate 218 is inclined downwardly, slightly to the left, as seen in Figs. 10 and 11, in accordance with the natural taper of the rounds 104 so that the upper portions of the latter will be tangent to a plane normal to the hopper support side walls 112. The lateral flanges 236' and 238' are supported on the upper edges of the outer semicylindrical shell 228, as shown, and are formed along their inner edges with flanges extending downwardly below such upper edges of the shell 228 on the inside of the latter.

As may be seen from Fig. 11, the righthand ends of ammunition bearing plate 218 and guide angle flanges 236' and 238' are spaced below the transverse support 136 for the ammunition camming guide 138 to accommodate movement of the rounds 104 therebetween into the flexible feed chute 206, the first or left hand link of which is rigidly secured to the walls 232 and 234 and the guide support 136 in any suitable manner, not shown.

The flexible feed chute comprises a series of identically shaped links 240 each consisting of a generally rectangular wall portion 242 and a generally semicylindrical wall portion 244, as shown in Fig. 12. The rectangular portion 242 has a shape conforming substantially to the natural taper of the rounds 104, as illustrated, and includes a pair of lower, inwardly directed flanges 246 and 248 which are riveted to outwardly directed, upper flanges 250 and 252 on the cylindrical link portion 244. The diameter of the cylindrical link portion is somewhat greater than the diameter of the helical conveyor spring 204 so as to accommodate positioning of the spring therein, as shown.

The several links 240 making up the flexible feed chute 206 are hingedly connected, as by a series of overlapping shingles 254 and couplers 256 with their rectangular and cylindrical portions alined, so as to form a guideway 257 for the rounds into which peripherally projects the conveyor helix 204 for straddling of the rounds by the turns of the helix. The aforementioned first link of the chute is secured to the hopper support with the end of guideway 257 through the chute registered with the aforesaid space below the guide support 186 through which the rounds are advanced, so as to accommodate entrance of the rounds into the chute, and with its semicylindrical trough portion 244 registered with the righthand end of the outer semicylindrical shell 228 which encloses the helical conveyor spring 204. The helical conveyor spring extends through the several links of the feed chute, as shown in Fig. 2, which chute may be any desired length and terminates at the weapon reservoir and feed unit 300 to be shortly described.

The arrangement of the shingle groups 254 is such as to provide three equiangularly spaced bearing points or surfaces for the helical conveyor spring 204 on each link, which are located on a common circle having its center at the center of the semi-circular wall portion 244 of each link and extend lengthwise of the conveyor chute, to facilitate rotation of the spring in the flexible chute, and spaced bearing guides for the rounds to facilitate advancing of the rounds through the chute guideway by rotation of the spring. As is conventional in flexible ammunition chuting, the links will be so joined as to allow predetermined roll, fan, and twist of the chute and eliminate the possibility of such extreme curvature of the chute as to preclude movement of the rounds therethrough.

As was mentioned earlier, the weapon reservoir and feed unit or receiver 300 comprises a housing 302 defining an open-ended, rectangular chamber 304. The last link 240 of the flexible feed chute 206 is affixed to one end of the housing 302, by suitable means, not shown, with one open end of the chamber 304 registered with the guideway 257 so as to provide for movement of the rounds 104 from the chute into said chamber.

In Figs. 13–15 it may be seen that the inner planar wall of this rectangular chamber 304 is formed in part by one wall 306 of an inner, hollow, generally semicylindrical shell 308 the cylindrical wall of which is radially spaced from the inner walls of housing 302 to accommodate encircling of the inner shell by the free end of the conveyor spring.

The cylindrical wall of the inner shell 308 is longitudinally slotted at 310 and extending through this slot is a camming portion 312 of an arm 314 which is pivoted at 316 for pivotal movement between an extended position of projection of the camming portion 312 through the slot 310 (Fig. 14) and a retracted position (Fig. 15). The arm is biased to its extended position by a coil compression spring 318. Upon inward pivotal movement of the arm from its extended to its retracted position, it moves into operative engagement with a normally open microswitch, or reservoir sensing switch 320 to close the latter and thereby energize the conveyor clutch coil 582 which is in circuit with the reservoir sensing switch 320, as will shortly be discussed. Leads extend from this switch, to an electrical receptacle 322 on the end wall of inner shell 308 and thence through a flexible conduit 324, within the conveyor spring 204, to the earlier mentioned receptacle 224.

As shown in Fig. 15, the coil conveyor spring 204, in normal unstressed condition has its free end encircling the inner reservoir shell 308 and extending to a position designated at A. In this normal condition of the conveyor spring, the turns thereof engage the camming portion 312 of the arm 314 to retain the latter in retracted position within the inner reservoir shell and maintain the reservoir sensing switch 320 is closed condition. During operation of the system as will presently be more fully described, feeding of rounds into the weapon reservoir chamber 304 to fill the latter results in retraction of the spring and movement of its turns out of engagement with the arm 314 to permit the latter to move to its extended position under the action of its biasing spring 318 with resultant opening of switch 320 and de-energizing of the conveyor clutch coil 582 to discontinue rotation of the conveyor spring 204.

The electrical control system for the present linkless feed system is schematically illustrated in Fig. 16 wherein the numeral 700 designates a suitable power supply having one terminal connected to one terminal of a manual switch 702 the other terminal of which is connected through a main lead 704 and a series of branch leads shown to one terminal of a trigger switch 706 associated with the weapon W, one terminal of the feed motor 434, one terminal of the weapon reservoir sensing switch 320, and one terminal of the hopper load sensing switch 564. The other terminal of the power supply 700 is connected through a lead 706 and the branch leads shown, to the other terminal of the drive motor 434, one terminal of the hopper clutch coil 472, and one terminal of the conveyor clutch coil 582, the other terminal of the latter clutch coils being connected to the other terminals of the hopper load sensing switch and reservoir sensing switch 564 and 320 respectively.

From this description of the electrical control system, it will be seen that closing of the manual control switch 702 will energize the drive motor 434 and cause energizing of the conveyor and hopper clutch coils 582 and 472 when their respective sensing switches 320 and 564 are in their closed condition. Electrically operated weapon accessories A may be connected in the control circuit, as shown.

*Operation*

Assuming the conveyor system 200 and reservoir 300 to be empty of all rounds and that no hoppers 102 are on the hopper support 106 it will be clear from the preceding description that pawl assembly 544 will be retained in the position illustrated in Fig. 7 under the action of the spring 550, so that stud 562 is disengaged from the hopper load sensing switch 564 and the latter will be in a closed condition. Also, the coil conveyor spring 204 will be unstressed so as to be extended to its normal length, designated at A (Fig. 15) and arm 314 will be retained in its retracted position, shown in that figure, by the turns of the conveyor spring to retain the reservoir sensing switch 320 in its closed condition. Upon closing of manual switch 702 in the control circuit of Fig. 16, to energize the feed system drive motor 434, the hopper and conveyor clutch coils 472 and 582 will be also energized so that clutch plates 438 and 452 of the hopper drive system, and clutch plates 568 and 572 of the conveyor drive system will be retained in driving engagement. Hopper drive chains 110 and the helical conveyor spring 204 will, therefore, be driven from the drive motor 434 in the manner previously described.

A series of hoppers 102 filled with unlinked rounds 104 are loaded on the rails 114 of the hopper support 106 over the lid bin 132, the bottom lids 134 of the hoppers retaining the rounds within the latter at this time, as was previously mentioned. The hoppers are manually moved along the rails in the direction indicated until one or the other of the teeth 542 on the hopper feed chains 110 engage with the lugs 126 on the first and then the second hopper whereupon the latter will be advanced toward the ammunition camming guide 138. As the hoppers are thus fed, the forward edges of the hopper lids engage with the forward end wall 128 of the lid bin 132 and are retained stationary while the hoppers advance toward the guide. After separation of the lids from the hoppers, the lids fall to the bottom of the lid bin 132 for subsequent reuse thereof.

Upon engagement of the drive chain teeth 542 with the hopper lugs 126, the load on the drive chains 110 will increase, and since the chains are driven from the motor 434 through the coil spring 508 the tension in the latter will be increased, by winding thereof by relative rotation of the rotary housing 502 to which one end of the spring is attached and the ring gear 494 to which the other end of the spring is attached. This increased load on the drive chains will be reflected in an increased reaction thrust of the planet pinions 476 on the ratchet wheel 480 tending to rotate the latter, in the direction indicated in Fig. 7, against the action of the spring biased pawl 546. The loading of the spring in the pawl, however, will be made sufficient to retain the ratchet wheel against rotation with this load on the drive chains.

Advancing of the hoppers will bring the rounds 104 in the first hopper into contact with ammunition guide 138 which penetrates to the interior of the hopper through the slot 142 in the forward wall thereof to engage the ammunition therein. The load on the hopper drive chains is thereby further increased with resultant increased winding of the coil spring 508. The rounds of ammunition in the hopper are cammed downwardly, as shown in Figs. 2 and 4, through the conveyor entrance opening 140 and drop into positions between adjacent turns of the helical conveyor spring 204 which, at this time, will be rotated by the drive motor 434 since reservoir sensing switch 320 is closed, as just mentioned. This rotation of the conveyor spring conveys the rounds through the guideway 257 in flexible feed chute 206 away from the entrance opening 140 and toward the weapon reservoir 300.

Continued advancing of the hoppers by the drive chains 110 with the guide 138 in engagement of the rounds 104 in the first hopper, will eventually increase the load on the chains, with resultant winding of the coil spring 508, to such an extent that the reaction thrust exerted by the planet pinions 476 on the ratchet wheel 480 overcomes the thrust of the restraining pawl 546. The ratchet wheel will then be rotated, in the direction indicated in Fig. 7, against the action of the pawl biasing spring 550 with resultant downward movement of the pawl and engagement of stud 562 with the hopper load sensing switch 564 to open the latter and de-energize the hopper clutch coil 472. De-energization of the coil results in the hopper clutch plate 452 being biased, by its spring 464, into engagement with the friction insert 466 on the section 408 which act to brake the latter clutch plate against rotation to prevent unwinding of the coil spring 508. Thus, this tensioned coil spring will act to maintain resilient forced engagement of the rounds in the hopper with the ammunition guide 138.

As the rounds feed from the hopper into the conveyor system, with the hopper clutch plate 452 braked, as above described, the hoppers will continue to be advanced by unwinding of the coil spring 508 to maintain the ammunition camming guide 138 in forced contact with the ammunition rounds in the first hopper. From an inspection of Fig. 7, it will be apparent that with sun gear 474 restrained against rotation due to braking of the hopper clutch plate 452, the spring biased pawl 546, presently in its depressed position, wherein it retains hopper sensing switch 564 in its open position, will exert a force on the ratchet wheel 480, tending to rotate the latter in a counterclockwise direction, as viewed in the latter figure, and cause planetation of the pinions 476 about the sun gear 474. This planetation of the pinions is initially precluded due to the clockwise torque exerted on the ring gear 494, meshed with the planet pinions 476, by the coil spring 508. As the tension of the coil spring is reduced, by unwinding of the latter to feed the hopper against the ammunition camming guide, as above described, the clockwise thrust on the ring gear is correspondingly reduced and will eventually decrease to such a value as to be overcome by the action of the spring biased pawl. The ratchet wheel 480 will then be rotated in a counter-clockwise direction, with resultant counterclockwise planetation of the planet pinions 476 around the sun gear 474, and rotation of the ring gear 494 in a counter-clockwise direction.

Pawl 546 will thus move to its extended position wherein stud 562 is out of operative engagement with the hopper sensing switch 564 so that the latter will reclose to re-energize the hopper clutch coil 472 and driving of hopper drive chains 110 by the drive motor 434 will continue. The hoppers will continue to be advanced by the drive motor against the ammunition guide until the load on the drive chains again becomes sufficient to cause depression of the pawl 546 into operative engagement with the hopper load sensing switch 564 and re-opening of the latter. Thus, it will be seen that the hopper feed system is operative to maintain a predetermined minimum contact pressure between the ammunition guide and the rounds in the hopper so as to assure continued feeding of the rounds through the conveyor entrance opening to positions between the adjacent turns of the conveyor spring.

As previously mentioned, the drive motor 434 is also operative to rotate the helical conveyor spring 204, through the conveyor clutch plates 568, 572, presently retained in driving engagement by the energized conveyor clutch coil 582, to feed the rounds away from the conveyor entrance opening 140 and toward the weapon reservoir and feed unit 300. During the initial phase of advancing of the rounds to the weapon reservoir feed unit, the forward end of the conveyor spring will be in its normal extended position wherein its forward end occupies the position designated by A in Fig. 15. Continued feeding of the rounds to the reservoir, with the weapon W inoperative, will result in the first round being moved into reservoir chamber 304 to a position adjacent the weapon, the second round to position in abutment with the first round, and so forth. It will be seen that as the reservoir chamber becomes filled, continued rotation of the conveyor spring will result in unwinding thereof out of the reservoir and axial contraction of its several turns. This unwinding of the conveyor spring and contraction of its turns upon the reservoir being charged with rounds, five being the example used in the embodiment illustrated, will result in the last turn moving off the reservoir sensing switch actuating arm 314, to the position of Fig. 14. The arm 314 will now be biased to its aforesaid extended position under the action of its biasing spring 318, with resultant opening of the reservoir sensing switch 320 to de-energize the conveyor clutch coil 582. The conveyor clutch plate 572 is thereby released for movement, under the action of its biasing spring 576, into braking engagement with the friction insert 578 on the section 412 to prevent the conveyor spring from unwinding. Driving of the conveyor spring 204 is thus terminated which will, of course, result in termination of feeding operation of the hopper drive system.

When the weapon W is fired by depression of the trigger 706 in Fig. 16, the axially compressed conveyor spring 204 will act to eject the rounds from the weapon reservoir into the chamber of the weapon until the first turn of the conveyor spring again moves onto the sensing switch actuating arm 314 to cam the latter to its retracted position and cause reclosing of the reservoir sensing switch 320 to continue rotation of the conveyor spring. Thus, when the weapon is being fired, the conveyor system will continue to be operative to feed rounds through the reservoir into the weapon and the hopper feed system will continue to be operative, in the manner previously described, to advance the hoppers and cause feeding of the rounds to the conveyor system. A high rate of fire of large quantities of ammunition may thus be obtained by continued loading of filled hoppers on the loading end of the hopper support 106 so that the hoppers will be advanced in continuous fashion over the conveyor entrance opening 140 until emptied whereupon they are moved to the righthand, unloading end of the hopper support for removal and refilling. As shown in Figs. 1 and 2, the rails 114 are extended to this unloading end of the support.

The invention may be also embodied in a turret system, as illustrated in Figs. 17-19. Such a turret arrangement may be employed for example in an armored vehicle of the type shown in Fig. 17 wherein the frame of the vehicle includes an upper, generally cylindrical turret housing 800. This housing has an upper circular opening 802 the periphery of which is shouldered, as shown most clearly in Fig. 19, to receive a circular bearing assembly 804 on which is supported, for rotation about a vertical axis, a turret 806.

This turret is formed with an annular flange 810 supported on the cylindrical bearing ring 804. Suitable drive means, not shown, will be provided for powered rotation of the turret about a vertical axis in either direction under the control of an operator or operators seated therein. The turret has openings in which are disposed a swivel mounting 812 for a weapon 814 to accommodate substantially 90 degree elevational movement of the weapon, as indicated in Fig. 19 and limited traverse of the weapon independently of turret traverse. The other openings will have mounted therein swivel supports 816 for pairs of periscopes 818 to be used for low and high angles of observation and by which the weapon will be aimed, the weapon and periscopes supports being geared for simultaneous, swivel movement about horizontal axis to accommodate aiming of the weapon at the target by viewing of the latter through one or the other of the periscopes, with the lower periscope in use at low weapon elevations and the upper periscope in use at high weapon elevations, with the gearing connection between the weapon and periscope assembly being a reduction to permit minimum motion of the periscope assembly so as to remain within the physical limitations of operator motion.

Formed on the lower end of the turret 806, is an annular flange 820 having an inturned annular flange 822 on which is supported a second bearing ring 824. Rotatably supported on the second bearing ring is a hollow, generally hemispherical ammunition storage container or ring 826 including radially spaced hemispherical walls 828 and 830. The lower end of the supply ring is closed by an annular wall 832 joined to the lower edges of the hemispherical walls 828 and 830, the upper end of the supply ring being open and closed by a generally conical wall 834 rigid on the turret flange 820. This wall is continuous except for an opening 836 defining an entrance opening of an ammunition conveyor system 838 which is substantially identical to that previously described with relation to the hopper arrangement of Figs. 1–16.

Thus, the conveyor system 838 comprises a housing 840 enclosing a drive motor and drive mechanism, not shown, including a magnetically operated clutch and gearing, identical to that previously described, for rotating a helical conveyor spring 842 to convey rounds away from the entrance opening 836, through a flexible feed chute 844 to a weapon reservoir and feed unit 846 secured to the weapon 814. The feed chute 844 and weapon reservoir 846 are identical to the chute and reservoir previously described.

The rounds 846 of ammunition in the supply ring 826 are contained in vertical columns, circumferentially spaced around the ring, by a series of pairs of partition walls 848 and 850 on the inner surfaces of the hemispherical walls 828 and 830 of the ring. The partition walls 848 and 850 of each pair are coplanarly disposed and have inner arcuate edges which are spaced, as shown, adjacent pairs of the walls being spaced to receive multiple or single vertical rows of the rounds 846 therebetween and being disposed in radial planes of the supply ring, as shown most clearly in Fig. 18. It will be apparent from an inspection of Figs. 18–19 that the hemispherical shape of the supply ring takes advantage of the natural taper of the rounds to achieve maximum ammunition storage in a minimum envelope.

Indicated at 852 is an arcuate, inclined ammunition camming guide which is rigidly secured at its upper end to the conical wall 834, at the forward end of the entrance opening 836, and extends downwardly into the supply ring 826, the lower tip of the guide being laterally reduced at 854 and projecting into an annular groove 856 in the annular bottom wall 832 of the ring. The guide is alined with, curved in conformance with, and has a thickness less than the width of the arcuate spaces or slots between the inner edges of the several pairs of partition walls 848 and 850 so as to enable rotation of the supply ring relative to the guide, the latter moving between the partition walls of each pair of walls during such rotation of the ring. The entrance opening 836 extends from the upper base of the guide 852 to the vertical plane passing through the lower tip of the guide so that upon rotation of the ring, in the direction indicated, relative to the guide, the rounds 846 of ammunition, contained in single or multiple vertical columns between the partition walls 848 and 850 will be cammed upwardly by the guide through the entrance opening 836, and will be moved to positions of engagement between adjacent turns of the helical conveyor spring 842, for transfer to the reservoir and feed unit 846 by rotation of the spring, as in the previously described hopper system.

Indicated at 860, is a supply ring actuator which serves to drive the supply ring in rotation for camming of the rounds toward the conveyor entrance opening 836. Thus, the turret application of the present linkless feed system utilizes a separate drive means for the ammunition storage container, that is, the supply ring 826, rather than driving the ring and the conveyor from a common drive means as in the case of the replaceable hopper feed system of Figs. 1–15. This supply ring actuator comprises a housing 862 enclosing a drive motor and drive mechanism including a magnetic clutch, coil spring, planetary gearing and a resiliently restrained ratchet wheel, not shown, identical to the previously described hopper feed system. Actuator 860 drives suitable gearing, not shown, meshing with a ring gear 864 formed along the upper edge of the inner supply ring wall 830 for rotation of the supply ring by the actuator 860. The conical wall 834 is provided with an opening closed by an access door 866 for loading of ammunition into the supply ring. Means, such as a flexible feed chute, not shown, leading from the weapon 814 through the wall of turret 806 for outboard discharge of expended cartridge cases will, obviously, be provided.

While embodying a different type of ammunition storage container and separate drives for the helical conveyor spring and ammunition storage ring, operation of the turret installation is susbtantially identical to the previously described operation of the hopper feed system. Thus upon closing of a manual control switch (see Fig. 16) in an electrical control circuit, not shown, of the turret feed system, supply ring 826 and coil conveyor spring 842 will be driven by their respective motors until the thrust exerted by the camming guide 852 on the rounds 846 of ammunition in the supply ring becomes sufficient to cause de-energizing of the magnetic clutch coil, not shown, in the supply ring actuator 860 and discontinuance of driving of the supply ring in the same manner that the hopper clutch coil was de-energized to terminate advancing of the hoppers in the feed system of Figs. 1–15. Likewise, coil conveyor spring 842 will be rotated by its drive motor to convey rounds to the weapon reservoir 846 until the latter is completely filled with ammunition whereupon rotation of the coil conveyor spring will be terminated in the manner previously described in reference to the hopper feed system. When the weapon 814 is fired, the conveyor system 838 will again be rendered operative to feed rounds to the weapon and supply actuator 860 will again be operative to drive the supply ring and cause feeding of the rounds to the conveyor entrance opening.

It will be observed that in both forms of the invention, the tip of the camming guide is located sufficiently close to the wall of the storage container opposite its open side as to prevent passage of rounds between this wall and the guide. Thus, all of the rounds are removed from the container during a single pass of the latter past the conveyor entrance opening.

The handling system of the invention has been disclosed for use in conveying shells to a gun. Obviously, however, other types of ammunition such as rockets and missiles, may be handled, and in fact, the system may be used to handle articles other than ammunition. While the helical conveyor embodied in the illustrated ammunition handling system has been disclosed as a helical spring and as being employed for conveying ammunition to a gun, it will be apparent that it may, as well, be used to convey spent cartridge cases from a gun and may assume various other forms such as a helical bellows. In other installations the helix may comprise a rigid, auger-like element, and may have a single lead, as shown, or a double lead, and in some cases, the helix turns might straddle rounds at diametrically opposite sides of the helix to simultaneously advance two groups of rounds through appropriately configured feed chuting.

Accordingly, the handling system herein described and illustrated is intended to be illustrative in nature only, it being apparent that numerous modifications in use, and design and arrangement of parts is possible without departing from the spirit and scope of the following claims.

I claim:

1. An ammunition handling system for storing and dispensing rounds of ammunition to an automatic weapon, comprising: an elongated support having an ammunition support plate extending lengthwise of the support at one side thereof, the support plate terminating at one end to form one side of a generally rectangular conveyor entrance opening in said side, a camming guide rigid on the support at the opposite side of said opening intermediate the other two sides of the opening and inclined outwardly from the plane of and toward said one side of the opening, an ammunition conveyor including a guideway for guiding rounds of ammunition for movement thereof in a direction normal to their length along a defined path, said entrance opening overlying one end of said guideway, a rotary helix peripherally projecting into the guideway and having adjacent turns spaced a distance slightly greater than the diameter of the rounds for straddling of the rounds in the guideway by the turns of the helix, means for rotating the helix in a direction to feed the rounds along the guideway way from said entrance opening, and a rectangular hopper having side walls spaced to receive rounds therebetween with the axes of the rounds extending normal to the side walls, end walls extending between said side walls, one of the other sides of the hopper being open, and a lid closing said open side and removable from the hopper by sliding movement thereof endwise of the hopper, said end walls being slotted intermediate said side walls to receive said guide and accommodate endwise movement of the hopper along the support plate from a loading position at the other end of the plate to an unloading position beyond the guide and entrance opening with said open side of the hopper facing said plate, the hopper lid being engageable with said other end of the plate during the initial portion of said movement to effect sliding removal of the lid and the open side of the hopper being closed by said support plate as the lid is removed, means for moving the hopper along the plate, said inclined guide being engageable with the rounds in the hopper during movement of the latter over said entrance opening for camming the rounds from the hopper through the entrance opening to positions of engagement between the turns of the helix.

2. In an article handling system including an article conveyor having a frame formed with an entrance opening through which articles to be handled are adapted to feed into the conveyor, the improvements comprising: a bulk storage container for holding a quantity of articles to be handled, said container having an open side through which articles are adapted to pass from the container, drive means for moving said container past said entrance opening with the open side of the container facing said entrance opening, a rigid camming guide on said frame engageable with articles in said container through said open side of the latter, said guide extending over and inclining toward said entrance opening in the direction of movement of said container, articles in the container being pressed against said guide and cammed by the latter into said entrance opening during movement of said container past said entrance opening by said drive means, and said drive means including a drive motor, driven means operated by said motor for relatively moving said container and frame, and an elastic coupling between said motor and driven means, said coupling being tensed during operation of said drive motor whereby articles in said container are resiliently pressed against said guide.

3. An article handling system comprising an article conveyor including a frame having an entrance opening through which articles to be handled are adapted to feed into the conveyor, intermittently operable conveyor means for feeding the entering articles away from said opening, a bulk storage container for holding a quantity of said articles, said container having an open side through which articles may pass from the container, drive means for moving said container past said entrance opening with said open side of the container facing said entrance opening, means for effecting movement of articles from said container into said conveyor through said open side and said entrance opening during movement of said container past the latter opening, receiver means to which articles are delivered by said conveyor means and from which articles are intermittently extracted, said receiver means including a chamber for holding a given number of articles, means for terminating operation of said conveyor means when said receiver means contains said given number of articles, and means for terminating operation of said drive means to discontinue relative movement of said container and frame and feeding of articles from the container into the conveyor upon termination of operation of the latter.

4. In an article handling system, a conveyor for the articles to be handled comprising: means defining a guideway for slideably guiding the articles along a defined path and formed with an entrance opening through which said articles are adapted to feed into said guideway, an axially movable, rotary helix projecting into said guideway, the turns of said helix being spaced lengthwise of said guideway for receiving therebetween the articles as they enter said opening, rotary drive means for turning said helix to feed said articles away from said opening, a receiver including a chamber communicating with said guideway into which said articles are fed and from which said articles are intermittently extracted, said helix normally extending into said chamber and being unthreaded from the latter upon continued turning of said helix with a given number of articles in said chamber, and control means engaged by said helix upon predetermined unthreading movement of the latter for deactivating said drive means to discontinue feeding of articles to said receiver.

5. The subject matter of claim 4 wherein said helix comprises a resilient, longitudinally extensible and compressible helical member, said member being compressed during unthreading thereof from said chamber to exert a resilient load on the articles in said chamber tending to eject the articles from the chamber.

6. The subject matter of claim 4 wherein said drive means comprises electrical drive mechanism, and said control means comprises switch means in circuit with said drive mechanism and operated by longitudinal movement of said helix into and out of said chamber.

7. The subject matter of claim 4 wherein said helix comprises a resilient helical member connected at one end to said drive means and which is torsionally tensed when rotated by said drive means, and said drive means including brake means operated by said control means for braking said one end of said helical member against unwinding whereby to maintain a resilient load on the articles in the guideway upon deactivation of said drive means.

8. In an ammunition handling system, a conveyor for feeding unlinked rounds of ammunition comprising a flexible feed chute including a series of hinged links spaced lengthwise of the chute and defining a first longitudinal, generally rectangular guideway for slideably guiding said rounds for movement in a direction normal to their length, said guideway having laterally spaced, longitudinally extending portions for slideably supporting the nose and breech ends of said rounds, said links defining a second longitudinal, generally semicircular guideway communicating with said first guideway for the entire length of the latter between said laterally spaced portions of the first guideway, a rotary helix extending longitudinally within said second guideway, the turns of said helix projecting into said first guideway between said spaced portions and having its turns spaced to straddle rounds in said first guideway, means for rotating said helix to feed said rounds along said first guideway, and means on each link within said guideways providing bearing surfaces for rotatably supporting said helix, said bearing surfaces extending lengthwise of the chute and being arranged on and spaced about a common circle having its center at the center of said second guideway.

9. The subject matter of claim 8 wherein said bearing surfaces on each link are three in number and generally equi-angularly spaced.

10. The subject matter of claim 8 wherein said feed chute has a lateral entrance opening at one end through which said rounds are adapted to feed into said first guideway, said helix having one end underlying said opening, and a guide member extending into said one end of said helix and formed with an inclined ramp surface facing said opening and extending to said first guideway substantially flush with the inner round supporting surfaces of said spaced portions for slideably supporting the entering round and guiding the latter into said first guideway.

11. An ammunition handling system for storing and dispensing rounds of ammunition to an automatic weapon, comprising: an ammunition storage ring including a pair of concentric, radially spaced, generally hemispherical side walls having concentric circular edges at opposite sides of the ring, a first annular wall on said ring closing the space between the walls at one side of the ring, the space between the walls at the other side of the ring being open to form an annular opening to the ring interior, a plurality of pairs of radially disposed walls on the inner surfaces of the side walls extending normal to said annular opening, the walls of each pair of radial walls being coplanar and having spaced, arcuate inner edges defining arcuate slots parallel to the side walls, said pairs of walls forming sector-shaped compartments and being spaced to receive a column of rounds therebetween, a support rotatably carrying said ring and including a second relatively stationary annular wall closing said annular ring opening, there being a circumferentially extending opening in said second annular wall communicating to the ring interior, a curved camming guide rigid on said second annular wall at one end of and inclined toward the other end of the latter opening, said guide extending entirely through said ring to said first annular wall in alignment with said arcuate slots for relative movement of said guide through said arcuate slots during rotation of the ring, means for rotating said ring, an ammunition conveyor having an internal guideway for guiding rounds for movement in a direction normal to their length along a defined path, said guideway having an entrance opening aligned with said annular wall opening, said guide camming rounds out of said compartments into said guideway through said entrance opening during rotation of the ring, and movable conveyor means in said guideway for feeding rounds along said guideway away from said entrance opening.

12. A flexible ammunition conveyor chute for rounds of ammunition comprising a series of separate links spaced lengthwise of the chute and having wall portions defining a first longitudinal guideway generally rectangular in cross-section for slideably guiding said rounds for movement in a direction normal to their length, said guideway having laterally spaced, longitudinally extending portions for slideably supporting the nose and breech ends of the rounds, said links having other wall portions rigid on said first-mentioned wall portions defining a second generally semi-circular guideway extending lengthwise of and opening into said first guideway between said spaced portions of the latter, the chute being so configured in cross-section that a circle having its center approximately at the center of the second semi-circular guideway and a radius substantially equal to the internal radius of the latter guideway will pass through the first guideway, said wall portions being disposed entirely outside of said circle, and inwardly facing bearing surfaces on each link within said guideways angularly spaced about and disposed on said circle, said bearing surfaces extending lengthwise of said guideways.

13. The subject matter of claim 12 wherein said bearing surfaces on each link are three in number and equally spaced about the center of said second guideway.

14. A rotary drive comprising a frame, a rotary driving element and a rotary driven element on said frame, driving mechanism operatively connecting said elements including normally engaged clutch means having a driving part driven by said driving element, a planetary gear drive including a sun gear driven by the driven part of the clutch means, a ring gear driving said driven element, and at least one planet pinion meshed with said sun gear and ring gear, and a movable member on said frame rotatably supporting said pinion, a driving force on said pinion tending to move said member in one direction, force sensing means acting between said frame and member for restraining the latter against movement in said one direction and sensing the force exerted on said member tending to move the latter in said one direction, and means on said frame operated by said force sensing means and connected to said clutch means for disengaging the latter when said force attains a predetermined value.

15. The subject matter of claim 14 including an elastic coupling having one end operatively connected to the ring gear and its other end operatively connected to said driven element, and means for braking said one end of the coupling against rotation upon disengagement of said clutch means.

16. In an article handling system including an article conveyor having an elongate frame with an entrance opening through which articles to be handled are adapted to feed to the conveyor, the improvements comprising a rectangular bulk storage container for holding a quantity of articles to be handled, means for feeding said container in a given direction along said frame and over said entrance opening, said container having an open side facing said frame, a camming guide on said frame for camming articles from the container through the open side of the container and into said entrance opening during movement of the container over said entrance opening, said camming guide projecting into the path of movement of the container on the frame, said container including side walls at the leading and trailing sides of the container relative to its direction of movement and said side walls having slots opening through the open side of the container through which said guide passes during movement of the container over said entrance opening.

17. In an article handling system including an article conveyor having an elongate frame with an entrance opening through which articles to be handled are adapted to feed to the conveyor, the improvements comprising a bulk storage container for holding a quantity of articles to be handled, means on the frame to slidably support said container for movement from one end of the frame over said entrance opening to the other end of the frame, said container having an open side facing said frame, a camming guide on said frame for camming articles from said container through said open side thereof and into said entrance opening during movement of the container over said entrance opening, said container being removable from said other end of the frame for refilling and being replaceable on said one end of the frame when refilled, and drive means on said frame releasably engageable with said container for feeding the latter along the frame.

18. The subject matter of claim 17 including a slidably removable cover on said container closing said open side thereof, means on said one end of said frame engageable with said cover to retain the latter stationary as the container is fed along said frame away from said one end thereof whereby to effect removal of the cover from the container, and said frame including a panel between said last-mentioned means and said entrance opening for confining articles in the container.

19. In an article handling system including an article conveyor having a frame formed with an entrance opening through which articles to be handled are adapted to feed into the conveyor, the improvements comprising: a bulk storage container for holding a quantity of said articles, said container being of generally annular configuration and including a pair of spaced, substantially semi-spherical side walls and an annular end wall closing the container at one end, the other end of said container defining a generally annular opening through which articles are adapted to pass from the container, means rotatably supporting said container on said frame for movement of said annular opening past said entrance opening, means for rotating said container, and a rigid camming guide on said frame adjacent the trailing edge of said entrance opening relative to the direction of rotation of the container past the entrance opening which projects through the open side of the container, said guide extending completely through the container and having a tip end only slightly spaced from said container end wall so as to prevent movement of an article between said end wall and tip end, said guide being curved to conform to the spherical side walls of the container and inclined in a direction opposite to the direction of rotation of the container for camming articles from the container as the latter turns.

20. In an article handling system including an article conveyor having a frame with an entrance opening adapted to receive articles therethrough, the improvements comprising article storage means for containing a supply of said articles and having an open side, said storage means being movable past said entrance opening with the open side of the storage means registering with the opening, a camming guide adjacent said entrance opening and projecting outwardly from the plane thereof for camming articles from the storage means through the open side of the latter and through said entrance opening during movement of the storage means past said entrance opening, drive means for moving the storage means over the entrance opening in the direction of the guide to press articles in the storage means against the guide including a drive motor, a rotary driving mechanism between the motor and storage means, and overload means for sensing the torque transmitted through said mechanism and deactivating said drive means when said transmitted torque attains a predetermined maximum value, said mechanism comprising a planetary gear drive between said motor and storage means including a sun gear driven by the motor, a ring gear driving the storage means, at last one planet pinion meshing with the sun gear and ring gear, and a movable member on said frame rotatably supporting said pinion, a driving force on said pinion tending to move said member in one direction, and said overload means including force sensing means acting between said frame and member for restraining the latter against movement in said one direction and sensing the force exerted on said member tending to move the latter in said one direction, and means on said frame operated by said force sensing means for deactivating said drive means when said force attains a predetermined value.

21. In an article handling system including an article conveyor having a frame with an entrance opening adapted to receive articles therethrough, the improvements comprising article storage means for containing a supply of said articles and having an open side, said storage means being movable past said entrance opening with the open side of the storage means registering with the opening, a camming guide adjacent said entrance opening and projecting outwardly from the plane thereof for camming articles from the storage means through the open side of the latter and through said entrance opening during movement of the storage means past said entrance opening, drive means for moving the storage means over the entrance opening in the direction of the guide to press articles in the storage means against the guide including a drive motor, a rotary driving mechanism between the motor and storage means, and overload means for sensing the torque transmitted through said mechanism and deactivating said drive means when said transmitted torque attains a predetermined maximum value, said driving mechanism comprising an elastic coupling for effecting resilient pressure of the articles in the storage means against said guide, and brake means between the motor and coupling engageable upon deactuation of the drive means.

References Cited in the file of this patent

UNITED STATES PATENTS 681,439    Carr  ---------------- Aug. 27, 1901

(Other references on following page)

UNITED STATES PATENTS

| | | |
|---|---|---|
| 800,054 | Ayres | Sept. 19, 1905 |
| 1,101,174 | Gauntt | June 23, 1914 |
| 1,413,694 | Vollmer | Apr. 25, 1922 |
| 1,429,370 | Putnam | Sept. 19, 1922 |
| 2,045,757 | Constantin | June 30, 1936 |
| 2,077,419 | Kraeft | Apr. 20, 1937 |
| 2,414,960 | Martin | Jan. 28, 1947 |
| 2,459,934 | Haberlin | Jan. 25, 1949 |
| 2,464,905 | Turnbull | Mar. 22, 1949 |
| 2,477,264 | Pearson et al. | July 26, 1949 |
| 2,488,679 | Nobles | Nov. 22, 1949 |
| 2,528,945 | Carpenter | Nov. 7, 1950 |
| 2,563,496 | Schmidt | Aug. 7, 1951 |
| 2,612,248 | Feiertag | Sept. 30, 1952 |
| 2,617,300 | Pataki | Nov. 11, 1952 |
| 2,627,140 | Marzolf | Feb. 3, 1953 |
| 2,629,287 | Pearson | Feb. 24, 1953 |
| 2,710,561 | Dowd | June 14, 1955 |

FOREIGN PATENTS

| | | |
|---|---|---|
| 321,217 | Italy | Sept. 27, 1934 |
| 671,599 | Great Britain | May 7, 1952 |